US012756917B2

(12) United States Patent
Paek et al.

(10) Patent No.: US 12,756,917 B2
(45) Date of Patent: Oct. 6, 2026

(54) CAMERA MODULE WITH REFLECTION MODULE AND GUIDE BALL MEMBER FOR ROTATING REFLECTION MODULE

(71) Applicant: SAMSUNG ELECTRO-MECHANICS CO., LTD., Suwon-si (KR)

(72) Inventors: Seung Yun Paek, Suwon-si (KR); Jae Kyung Kim, Suwon-si (KR); Jung Woo Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 63 days.

(21) Appl. No.: 18/897,702

(22) Filed: Sep. 26, 2024

(65) Prior Publication Data

US 2025/0184589 A1 Jun. 5, 2025

(30) Foreign Application Priority Data

Nov. 30, 2023 (KR) ........................ 10-2023-0171756

(51) Int. Cl.

| | |
|---|---|
| ***H04N 23/55*** | (2023.01) |
| ***G03B 5/00*** | (2021.01) |
| ***G03B 17/12*** | (2021.01) |
| ***G03B 17/17*** | (2021.01) |
| ***G03B 30/00*** | (2021.01) |
| ***H04N 23/51*** | (2023.01) |

(52) U.S. Cl.

CPC ............. *H04N 23/55* (2023.01); *G03B 17/12* (2013.01); *G03B 17/17* (2013.01)

(58) Field of Classification Search

CPC ........ H04N 23/55; H04N 23/57; H04N 23/51; G03B 17/12; G03B 17/17; G03B 5/00; G03B 2205/0069; G03B 30/00

See application file for complete search history.

(56) References Cited

U.S. PATENT DOCUMENTS

| | | | | |
|---|---|---|---|---|
| 2019/0230262 | A1* | 7/2019 | Wang | G03B 5/02 |
| 2020/0363626 | A1* | 11/2020 | Seo | G03B 30/00 |
| 2022/0272238 | A1* | 8/2022 | Jang | G02B 7/20 |
| 2022/0279093 | A1 | 9/2022 | Kwon et al. | |

(Continued)

FOREIGN PATENT DOCUMENTS

| | | | |
|---|---|---|---|
| CN | 211429403 | U | 9/2020 |
| KR | 10-2021-0077656 | A | 6/2021 |
| KR | 10-2023-0004368 | A | 1/2023 |

(Continued)

OTHER PUBLICATIONS

Korean Office Action issued on Feb. 14, 2025, in corresponding Korean Patent Application No. 10-2023-0171756. (4pages in English, 4pages in Korean).

*Primary Examiner* — Ahmed A Berhan

(57) ABSTRACT

A camera module includes a reflection module; a housing provided for the reflection module to be rotatable; a guide ball member disposed between the reflection module and the housing to guide the rotation of the reflection module; and a ball receiving portion, coupled to the housing, including a groove portion where the guide ball member is disposed and a flange portion extending externally from the groove portion. The ball receiving portion is formed of a material having higher rigidity than a material of the housing.

16 Claims, 9 Drawing Sheets

(56) References Cited

U.S. PATENT DOCUMENTS

| | | | |
|---|---|---|---|
| 2023/0185053 | A1 | 6/2023 | Kim et al. |
| 2023/0288677 | A1 | 9/2023 | Lee |

FOREIGN PATENT DOCUMENTS

| | | | |
|---|---|---|---|
| KR | 10-2023-0089539 | A | 6/2023 |
| KR | 10-2023-0101784 | A | 7/2023 |
| KR | 10-2023-0133419 | A | 9/2023 |

* cited by examiner

CAMERA MODULE WITH REFLECTION MODULE AND GUIDE BALL MEMBER FOR ROTATING REFLECTION MODULE

CROSS-REFERENCE TO RELATED APPLICATIONS

This application claims the benefit under 35 USC 119(a) of Korean Patent Application No. 10-2023-0171756 filed on Nov. 30, 2023, in the Korean Intellectual Property Office, the entire disclosure of which is incorporated herein by reference for all purposes.

BACKGROUND

1. Field

The present disclosure relates to a camera module.

2. Description of the Background

A camera module disposed in a mobile device may be formed to have performance comparable to that of a conventional camera.

The camera module may adjust the zoom ratio by moving a lens module. To configure the high zoom ratio, it may be desirable to have a sufficient distance for light incident on the camera module to travel to an image sensor, that is, a total length or total track length (TTL). A camera module's overall length may increase when implementing a long total track length in an ever-decreasing mobile device size, making it harder to extend the length of the camera module.

In addition, a recent camera module may include a movable or rotatable reflector refracting or reflecting light to thus form a longer optical path while performing an optical image stabilization function.

A ball member capable of performing a rolling motion may be used to move or rotate the reflector. The ball member may be disposed in a housing, and in this case, a dent phenomenon may occur between the ball member and the housing due to repeated use of the camera module.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a reflection module; a housing provided for the reflection module to be rotatable; a guide ball member disposed between the reflection module and the housing to guide the rotation of the reflection module; and a ball receiving portion, coupled to the housing, including a groove portion where the guide ball member is disposed and a flange portion extending externally from the groove portion. The ball receiving portion is formed of a material having higher rigidity than a material of the housing.

The ball receiving portion may be coupled to a bottom surface of the housing, and an upper surface of the flange portion may be exposed externally from the bottom surface of the housing.

An upper surface of the flange portion and a portion of a bottom surface of the housing may be disposed on a same plane.

An upper surface of the flange portion may directly face the reflection module in a rotation axis direction of the reflection module.

The flange portion may separate the groove portion from a portion of a bottom surface of the housing in a direction perpendicular to a rotation axis of the reflection module.

A bottom surface of the groove portion may be flat.

The material of the ball receiving portion may be metal.

The camera module may further include grease coated on the groove portion.

The ball receiving portion may include a first ball receiving portion and a second ball receiving portion. The first ball receiving portion and the second ball receiving portion may be disposed on opposite sides of an intermediate position of the housing in a width direction.

The camera module may further include a connection part connecting the first ball receiving portion to the second ball receiving portion.

The camera module may further include a pulling yoke and a driving unit rotating the reflection module. The driving unit may include a driving magnet and a driving coil electromagnetically interacting with the driving magnet, and the pulling yoke may face the driving magnet.

The camera module may further include a pulling yoke and a driving unit rotating the reflection module. The driving unit may include a driving magnet and a driving coil electromagnetically interacting with the driving magnet, and the pulling yoke may face the driving magnet.

The camera module may further include a first ball member. The first ball member may be rotated in place and form a rotation axis about which the reflection module is rotated. The guide ball member may be configured to roll in the groove portion by the rotation of the reflection module.

In another general aspect, a camera module includes a reflection module; a housing configured to accommodate the reflection module to be rotatable; a guide ball member disposed between the reflection module and the housing to guide the rotation of the reflection module; and a ball receiving portion, coupled to the housing, comprising a groove portion and a flange portion extending externally from the groove portion. A material of the ball receiving portion has a higher rigidity than a material of the housing. The groove portion and the guide ball member are in one-point contact with each other.

A bottom surface of the groove portion may be curved.

The bottom surface may be curved based on a cross section of the groove portion in a width direction.

The cross section may have a radius of curvature greater than a radius of curvature of the guide ball member.

An upper surface of the flange portion may be exposed externally when viewing an internal side of the housing from an object side.

An upper surface of the flange portion and a portion of an inner bottom surface of the housing may be disposed on a same plane.

An upper surface of the flange portion may directly face the reflection module in a rotation axis direction in which the reflection module is rotated.

Other features and aspects will be apparent from the following detailed description, the drawings, and the claims.

Figure 1:
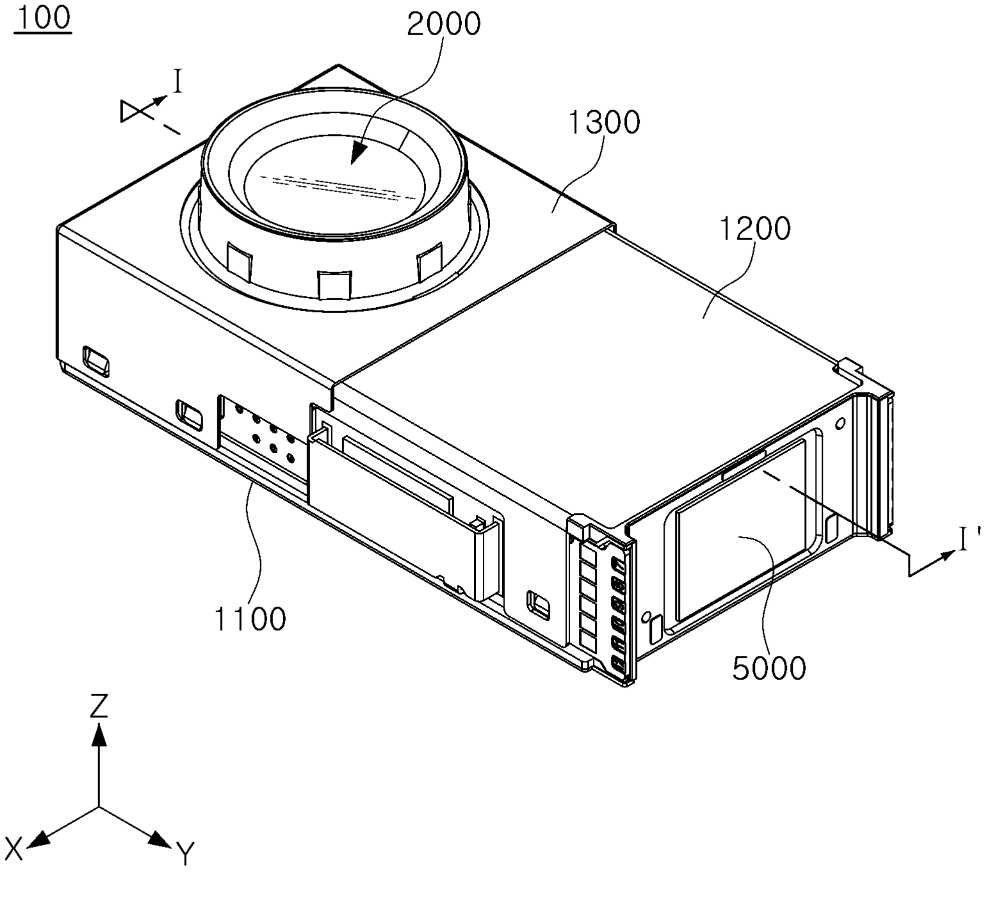
FIG. 1 is a perspective view of the camera module according to the present disclosure.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

In addition, in the following description, terms "upper side," "upper portion," "lower side," "lower portion," "side surface," "front surface," "rear surface," and the like, are described with reference to directions shown in the drawings, and it is to be noted in advance that these terms may be described differently when their corresponding targets have changed directions.

Figure 2:
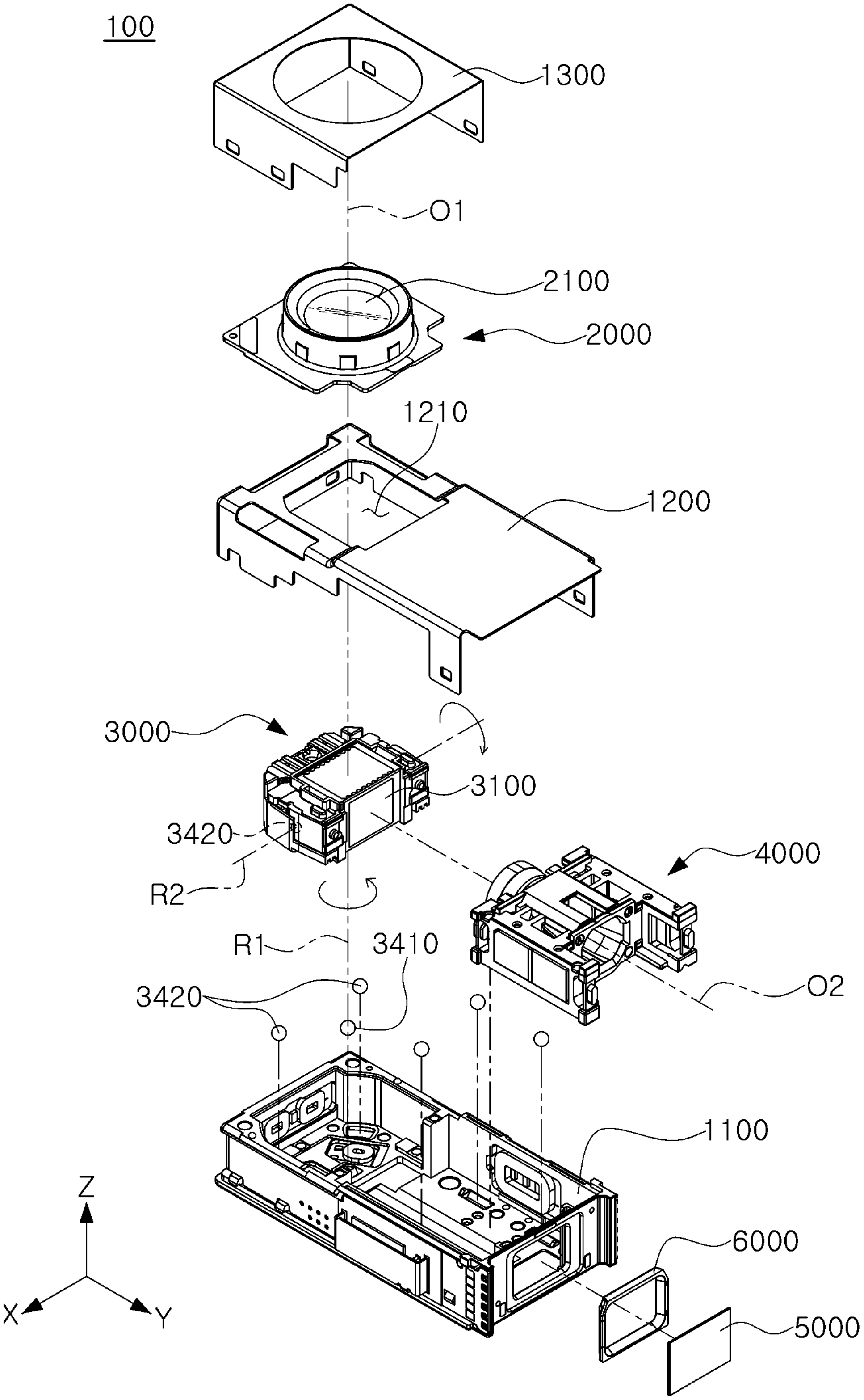
FIG. 2 is an exploded perspective view of the camera module according to the present disclosure.

FIG. 1 is a perspective view of the camera module according to the present disclosure; FIG. 2 is an exploded perspective view of the camera module according to the present disclosure; and FIG. 3 is a cross-sectional view of the camera module according to the present disclosure.

Figure 3:
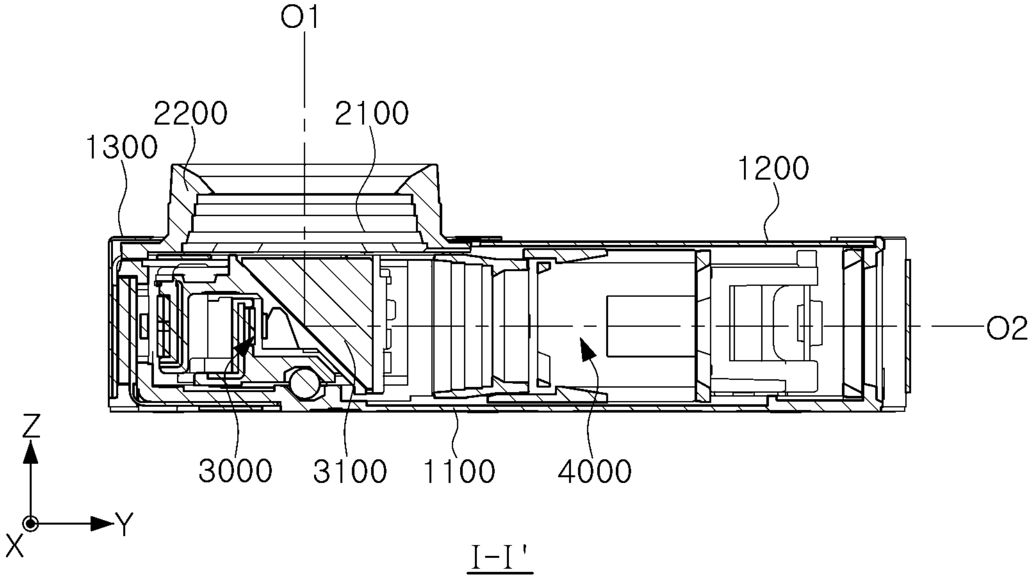
FIG. 3 is a cross-sectional view of the camera module according to the present disclosure.

Referring to FIGS. 1 through 3, a camera module 100 may include a housing 1100, a reflection module 3000, a plurality of lens modules 2000 and 4000, and an image sensor 5000.

The camera module 100 may include the plurality of lens modules 2000 and 4000. The plurality of lens modules 2000 and 4000 may include the first lens module 2000 and the second lens module 4000 having different optical axes. Light incident on the camera module 100 from an external subject may be incident on the image sensor 5000 through the first lens module 2000 and the second lens module 4000.

An optical axis O1 (hereinafter, the first optical axis O1) of the first lens module 2000 and an optical axis O2 (hereinafter, the second optical axis O2) of the second lens module 4000 may not be parallel to each other. For example, the first lens module 2000 and the second lens module 4000 may be disposed to intersect each other for the first optical axis O1 and the second optical axis O2. The first optical axis O1 and the second optical axis O2 may be approximately perpendicular to each other, and an angle between these optical axes is not limited thereto.

Lenses included in the first lens module 2000 or the second lens module 4000 may be movable relative to the image sensor 5000. For example, lenses 2100 included in the first lens module 2000 may be moved along the first optical axis O1. Alternatively, the lenses included in the second lens module 4000 may be moved along the second optical axis O2. The lens included in each of the lens modules 2000 and 4000 may be moved to thus perform the optical image stabilization (OIS) function or autofocus (AF) function of the camera module 100. For example, the camera module 100 may perform the AF function by moving the lens of the second lens module 4000 toward the second optical axis O2.

At least one of the lenses included in the first lens module 2000 or the second lens module 4000 may be fixed relative to the housing 1100. For example, in the camera module 100, the lens 2100 included in the first lens module 2000 may be fixed to the housing 1100, and the lens included in the second lens module 4000 may be moved toward the second optical axis O2.

In the camera module 100, the reflection module 3000 may be disposed, the reflection module 3000 changing a progression direction of light emitted from the first lens module 2000 to be parallel to the second optical axis O2. For example, referring to FIG. 3, the reflection module 3000, which changes the progression path of light, may be disposed between the first lens module 2000 and the second lens module 4000. That is, the camera module 100 may include the reflection module 3000 disposed on an optical path from the first lens module 2000 to the second lens module 4000.

The reflection module 3000 may be accommodated in an internal space of the housing 1100 to change the path of light incident on the reflection module 3000. Here, the reflection module 3000 may include a reflection member 3100 changing the path of light, components supporting and driving the reflection member 3100, and the housing 1100 accommodating these components.

The reflection member 3100 of the reflection module 3000 may change the progression path of light by refracting or reflecting light. For example, the reflection module 3000 may be a prism or mirror that changes the optical path by refracting or reflecting light.

The reflection member 3100 may change the progression path of light emitted from the first lens module 2000 toward the second lens module 4000. For example, the reflection member 3100 may change the progression path of light incident along the first optical axis O1 to be approximately parallel to the second optical axis O2. Accordingly, as shown in FIG. 3, incident light that is incident on the first lens module 2000 from the outside of the camera module 100 may change its progression path while passing through the reflection module 3000 to thus be incident on the second lens module 4000. Incident light may be appropriately refracted while passing through the second lens module 4000 to thus be incident on the image sensor 5000.

The reflection member 3100 may be rotatable or movable in the housing 1100. The path of light may be appropriately changed based on the rotation or movement of the reflection member 3100. The camera module 100 may perform the optical image stabilization (OIS) function by rotating or moving the reflection member 3100.

The reflection member 3100 may have a plurality of rotation axes to be rotated in different directions. For example, the reflection member 3100 may be rotated about a first rotation axis parallel to the first optical axis O1. Alternatively, the reflection member 3100 may also be rotated about a second rotation axis parallel to both the first optical axis O1 and the second optical axis O2. By this rotation, the reflection member 3100 may change the progression path of light to be approximately parallel to the second optical axis O2.

In the following description, the first rotation axis may also be briefly referred to as a "first axis," and the second rotation axis may also be briefly referred to as a "second axis". That is, unless otherwise indicated as "the optical axis," "the first axis or the second axis" may be understood as "the first rotation axis or second rotation axis" of the reflection module 3000.

In addition, an axis perpendicular to both the first rotation axis and the second rotation axis may be defined as a "third axis". For example, the second optical axis O2 may be approximately parallel to the third axis.

The camera module 100 may include the image sensor 5000 on which light passing through the reflection module 3000 and the plurality of lens modules 2000 and 4000 is incident. The image sensor 5000 may convert incident light into image information. The image sensor 5000 may have a light collection surface facing an emission surface of the second lens module 4000, and generate an electrical signal corresponding to light incident from the second lens module 4000.

The image sensor 5000 may be accommodated in the housing 1100 or disposed outside the housing 1100.

A filter unit 6000 that filters at least some of light incident from the lens module 4000 may be disposed in front of the image sensor 5000. The filter unit 6000 may include an optical filter (for example, an infrared ray (IR) cut filter), which may block light of a specific wavelength. Alternatively, the filter unit 6000 may include a light-blocking member (e.g., baffle) that blocks at least some of light incident from the lens module.

Although not shown in FIG. 2, to make the optical path longer, the camera module 100 may include another reflection module disposed between the lens module and the image sensor 5000 to change the optical path.

The housing 1100 may have the internal space for accommodating at least one of the reflection module 3000, the plurality of lens modules 2000 and 4000, or the image sensor 5000. The housing 1100 may be made of a material with predetermined rigidity to protect the components accommodated therein. The housing 1100 may be a box-shaped member with an open top. However, the material or shape of the housing 1100 is not limited thereto.

The camera module 100 may include a shield can 1200 covering the top of the housing 1100. The shield can 1200 may cover the open top of the housing 1100 to protect the components in the housing 1100 from an external environment.

The shield can 1200 may include an opening through which incident light passes. For example, as shown in FIG. 2, the shield can 1200 may include an opening 1210 disposed between the first lens module 2000 and the reflection module 3000. Light emitted from the first lens module 2000 may be incident on the reflection module 3000 below the first lens module 2000 through the opening 1210.

Figure 4:
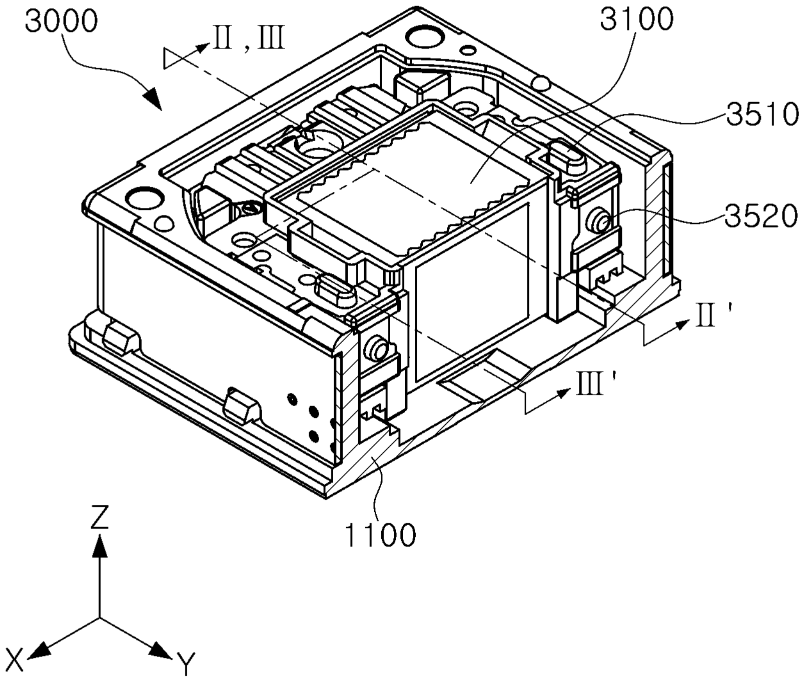
FIG. 4 is a perspective view of a reflection module disposed in a housing of the camera module according to the present disclosure.

In the camera module 100, according to one or more embodiments, some of the plurality of lens modules 2000 and 4000 may be disposed outside the housing 1100, and the others may be disposed in the housing 1100. For example, as shown in FIG. 3 or FIG. 4, the first lens module 2000 may be coupled to the outside of the housing 1100 and disposed above the reflection module 3000, and the second lens module 4000 may be disposed in the housing 1100. In this case, the emission surface of the lens included in the first lens module 2000 may face an incident surface of the reflection member 3100 included in the reflection module 3000.

The first lens module 2000 disposed outside the housing 1100, and the second lens module 4000 in the housing 1100 may have optical axes O1 and O2 intersecting each other. The reflection module 3000 may be disposed between the first lens module 2000 and the second lens module 4000, and may change the path of light progressing along the first optical axis O1 to the second optical axis O2. The plurality of lens modules 2000 and 4000 may have the optical axes O1 and O2 that intersect each other, thus reducing the overall length of the camera module 100 compared to when the plurality of lens modules 2000 and 4000 are disposed to be parallel to each other along the same optical axis.

When some of the lens modules are disposed outside the housing 1100, the camera module 100 may further include a component for securing structural or optical stability of the lens module disposed outside the housing 1100. For example, the camera module 100 may further include a cover 1300 that may shield a separation space between the first lens module 2000 and the housing 1100.

FIGS. 1 and 2 show that the second lens module 4000 and the reflection module 3000 are accommodated in one housing 1100, which is only an example. For example, the lens modules 2000 and 4000 and the reflection module 3000 may each be accommodated in a plurality of housings, configured as different parts, and then assembled together to form the entire camera module 100. The image sensor 5000 may also be disposed in a housing separate from that of the reflection module 3000 or the lens module 2000 or 4000. In this case, each individual part may be defined as a lens module assembly, a reflection module assembly, or the image sensor assembly. That is, the camera module 100 may include the reflection module assembly including the reflection module 3000, the lens module assembly including one or more lens modules 2000 and 4000, and the image sensor assembly.

Figure 5:
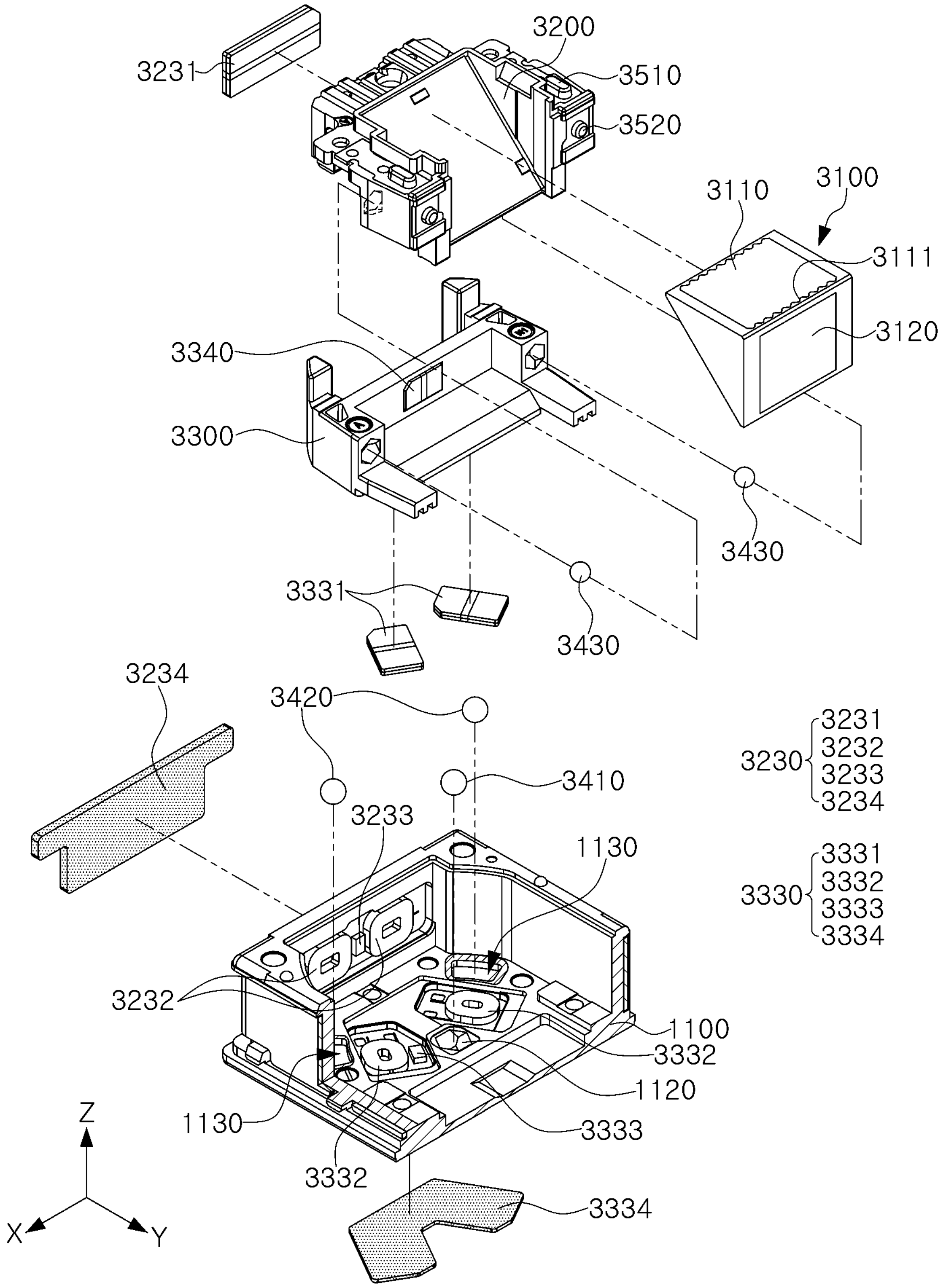
FIG. 5 is an exploded perspective view of the reflection module in FIG. 4.
Figure 6:
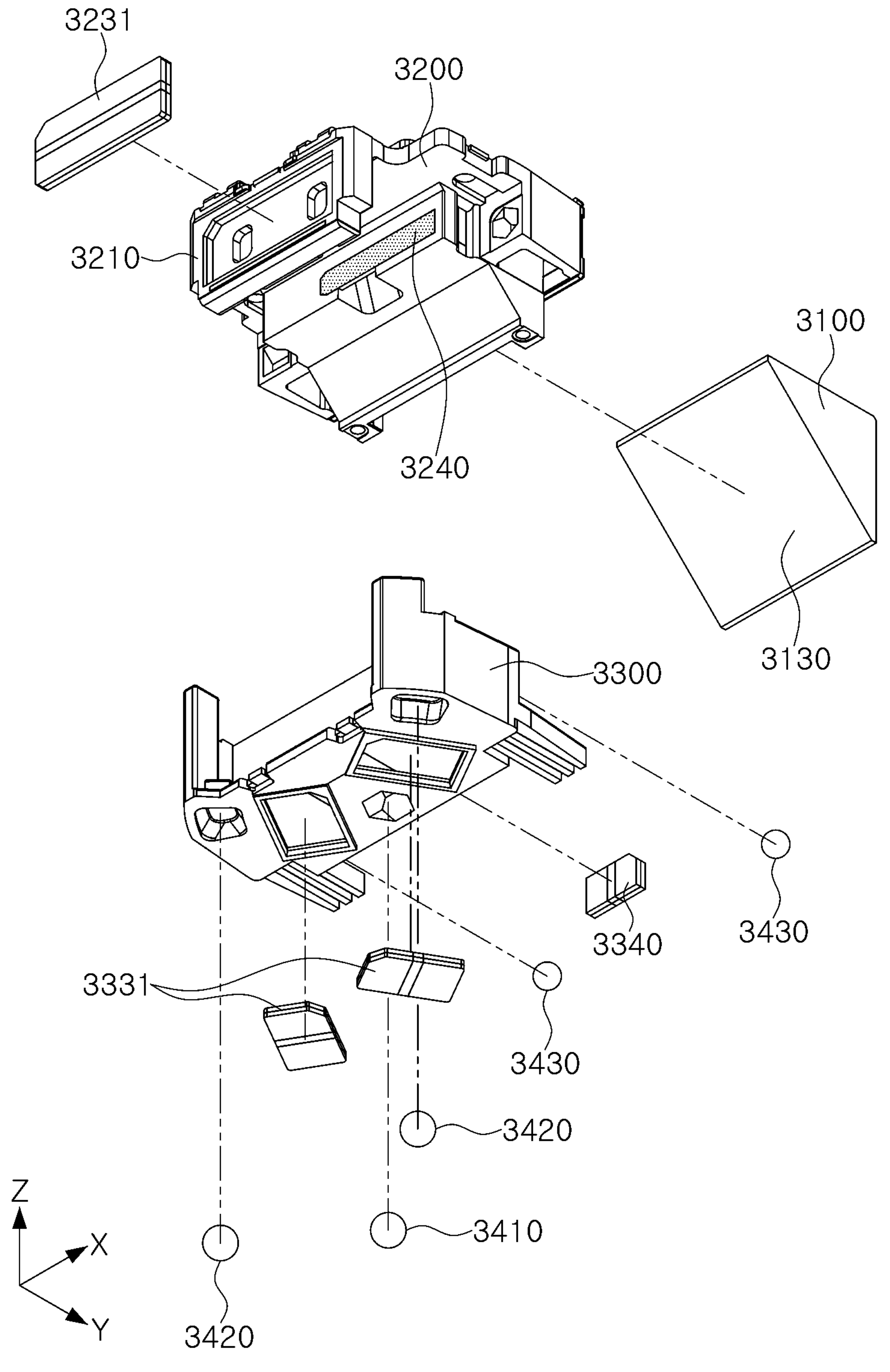
FIG. 6 is an exploded perspective view of the reflection module in FIG. 4 seen from another angle.

Hereinafter, the reflection module 3000 included in the camera module 100 is described in detail with reference to FIGS. 4 through 6. FIG. 4 is a perspective view of the reflection module disposed in the housing of the camera module according to the present disclosure. FIG. 5 is an exploded perspective view of the reflection module in FIG. 4. FIG. 6 is an exploded perspective view of the reflection module in FIG. 4 seen from another angle.

The reflection module 3000 and the camera module 100, including the same described with reference to FIGS. 4 through 6, may correspond to the reflection module 3000 and the camera module 100 described above with reference to FIGS. 2 to 4, and the description thus omits their redundant descriptions.

Referring to FIGS. 4 and 5, the reflection module 3000 may include the reflection member 3100 accommodated in the housing 1100 and capable of changing the optical path. The reflection member 3100 may include an incident surface 3110 on which light may be incident from the first lens module 2000 and an emission surface 3120 through which light may be emitted.

The reflection member 3100 may be movable in the housing 1100. For example, the reflection member 3100 may be rotated about different rotation axes R1 and R2. While being rotated in various directions, the reflection member 3100 may collide with another structure (e.g., inner wall of the housing 1100 or shield can) of the camera module 100. In this case, the reflection member 3100 may be damaged by impact, and may have noise caused by an irregular impact sound.

To prevent this risk, the reflection module 3000 may include dampers 3510 and 3520 protruding in various directions. For example, referring to FIG. 5, the reflection module 3000 may include a first damper 3510 protruding in a first direction or a second damper 3520 protruding in a second direction different from the first direction. The damper 3510 or 3520 of the reflection module 3000 may include a material capable of absorbing impact energy, thereby reducing the impact or noise (joint noise) occurring when the reflection module 3000 hits the inner wall of the housing 1100.

Referring to FIGS. 5 and 6, the reflection module 3000 may include the reflection member 3100, capable of changing the optical path, a reflection holder 3200, and a rotation holder 3300 that supports the reflection member 3100 to be movable.

The reflection member 3100 may change the progression path of light by refracting or reflecting incident light.

The reflection member 3100 may include the incident surface 3110 on which light is incident, a reflection surface 3130 on which light is reflected, and an emission surface 3120 on which reflected light is emitted. For example, light incident on the light incident surface 3110 in the first direction (Z-axis direction) may be reflected from the reflection surface 3130 to be emitted in the second direction (Y-axis direction). Here, the first direction (Z-axis direction) may be approximately parallel to the first optical axis O1 of the first lens module 2000, and the second direction (Y-axis direction) may be approximately parallel to the second optical axis O2 of the second lens module 4000.

The reflection member 3100 may include a light blocking part 3111, reducing a flare by blocking unnecessary light. For example, as shown in FIG. 5, the light blocking part blocking unnecessary light may be disposed at an edge of the incident surface 3110 of the reflection member 3100. However, the position of the light blocking part 3111 is not limited thereto, and may be disposed on the emission surface. In addition, although not shown in the drawings, separate from the light blocking part 3111, a light blocking member capable of performing a similar function as that of the light blocking part 3111 may be disposed while being spaced apart from the reflection member 3100. For example, the light blocking member may be a baffle disposed between the reflection member 3100 and the lens module 2000 or 4000.

The reflection member 3100 may be disposed in the reflection holder 3200. The reflection holder 3200 may support the reflection member 3100 to be rotated or moved. For example, the reflection holder 3200 may be rotated about the second rotation axis R2 passing through at least two ball members 3430. Accordingly, the reflection member 3100 disposed in the reflection holder 3200 may also be rotated together.

The reflection module 3000 may further include the rotation holder 3300, supporting the reflection holder 3200, to be movable or rotatable. The rotation holder 3300 may be rotatable or movable relative to the housing 1100 while simultaneously supporting the reflection holder 3200 to be rotatable. For example, the reflection holder 3200 may be rotatably supported by the rotation holder 3300 while having at least two ball members 3430 forming the rotation axis and interposed therebetween. In addition, the rotation holder 3300 may be supported by the housing 1100 while having at least one ball member 3410 interposed therebetween, and thus be rotatable relative to the housing 1100 by centering on another rotation axis formed by at least one ball member 3410. In order to distinguish the respective rotation axes, in the following description, the rotation axis of the rotation holder 3300 is referred to as the first rotation axis R1, and the rotation axis of the reflection holder 3200 is referred to as the second rotation axis R2.

In the reflection module 3000, according to one or more embodiments, the first rotation axis R1 and the second rotation axis R2 may differ. For example, the first rotation axis R1 and the second rotation axis R2 may be approximately perpendicular to each other.

The first axis rotation R1 may pass through the incident surface 3110 and reflection surface 3130 of the reflection member 3100. The second axis rotation R2 may be approximately parallel to the reflection surface 3130 of the reflection member 3100. For example, the second rotation axis R2 may be disposed on the reflection surface 3130, or may be parallel to the reflection surface 3130 while having a predetermined distance therefrom.

In the reflection module 3000, the first rotation axis R1 and the second rotation axis R2 may meet each other at one point. Here, the point where the first rotation axis R1 and the second rotation axis R2 meet each other may be disposed on the reflection surface 3130 of the reflection member 3100, or may be disposed to be adjacent to the reflection surface 3130.

When the reflection module 3000 is in its neutral position, the incident surface 3110 of the reflection member 3100 may be approximately perpendicular to the first optical axis O1 of the first lens module 2000, and the emission surface 3120 of the reflection member 3100 may be approximately perpendicular to the second optical axis O2 of the second lens module 4000. In this case, the first rotation axis R1 of the reflection module 3000 may approximately coincide with the first optical axis O1, and the second rotation axis R2 of the reflection module 3000 may be perpendicular to both the first optical axis O1 and the second optical axis O2. In addition, like the intersection point of the first rotation axis R1 and the second rotation axis R2, an intersection point of the first optical axis O1 and the second optical axis O2 may be positioned on the reflection surface 3130 of the reflection member 3100.

Even when an external force shakes the camera module 100 and light is thus incident to be misaligned with the first optical axis O1, the reflection member 3100 may be properly rotated to change the progression direction of light to be approximately parallel to the second optical axis O2.

The reflection module 3000 may further include a support member supporting the reflection holder 3200 to the rotation holder 3300. For example, the support member may include a pair of magnetic materials 3240 and 3340 facing each other and performing a magnetic action, and the reflection holder 3200 may be supported by the rotation holder 3300 by magnetic attraction or a magnetic repulsion, generated by the pair of magnetic materials 3240 and 3340.

The pair of magnetic materials 3240 and 3340 may be disposed separately in the reflection holder 3200 and the rotation holder 3300, respectively. For example, as shown in FIGS. 4 and 5, the pair of magnetic materials 3240 and 3340 may include the pulling yoke 3240 disposed on the reflection holder 3200 and the pulling magnet 3340 disposed on the rotation holder 3300. In this case, the pulling magnet 3340 and the pulling yoke 3240 may generate the magnetic attraction of pulling each other. By this magnetic attraction, the reflection holder 3200 may be supported by the rotation holder 3300 while having the ball member 3430 therebetween.

However, a configuration of the pair of magnetic materials 3240 and 3340 is not limited thereto. For example, the pulling magnet 3340 and the pulling yoke 3240 may be disposed on the reflection holder 3200 and the rotation holder 3300, respectively. Alternatively, the pair of magnetic materials 3240 and 3340 may both be the magnets.

The support member is not limited to the configuration of the magnetic materials 3240 and 3340 described above. The support member may be made of anything as long as the reflection holder 3200 may be supported by the rotation holder 3300 to be rotatable.

In one or more embodiments, the reflection module 3000 may include driving units 3230 and 3330 driving the reflection holder 3200 and the rotation holder 3300. For example, as shown in FIG. 5, the reflection module 3000 may include a first driving unit 3330 driving the rotation holder 3300 and a second driving unit 3230 driving the reflection holder 3200.

The first driving unit 3330 and the second driving unit 3230 may include a driving coil and a driving magnet, respectively. For example, the first driving unit 3330 may rotate the rotation holder 3300 by electromagnetic interaction between a first driving coil 3332 and a first driving magnet 3331 facing each other. In addition, the second driving unit 3230 may rotate the rotation holder 3200 by electromagnetic interaction between a second driving coil 3232 and a second driving magnet 3231 facing each other.

In the camera module, the driving magnet and the driving coil may be disposed on two components performing relative motions, respectively. For example, the first driving magnet 3331 may be disposed on the rotation holder 3300, and the first driving coil 3332 may be disposed in the housing 1100. The second driving magnet 3231 may be disposed on the reflection holder 3200, and the second driving coil 3232 may be disposed in the housing 1100.

Each driving unit 3230 or 3330 may include a position sensor 3233 or 3333 capable of detecting a movement amount of the driving magnet 3231 or 3331. For example, the first driving unit 3330 may include a first position sensor 3333 facing the first driving magnet 3331. The first position sensor 3333 may be disposed around and parallel to the first driving coil 3332 or disposed in the first driving coil 3332. Likewise, the second driving unit 3230 may include a second position sensor 3233 facing the second driving magnet 3231. The second position sensor 3233 may be disposed around and parallel to the second driving coil 3232 or may be disposed in the second driving coil 3232.

Figure 8:
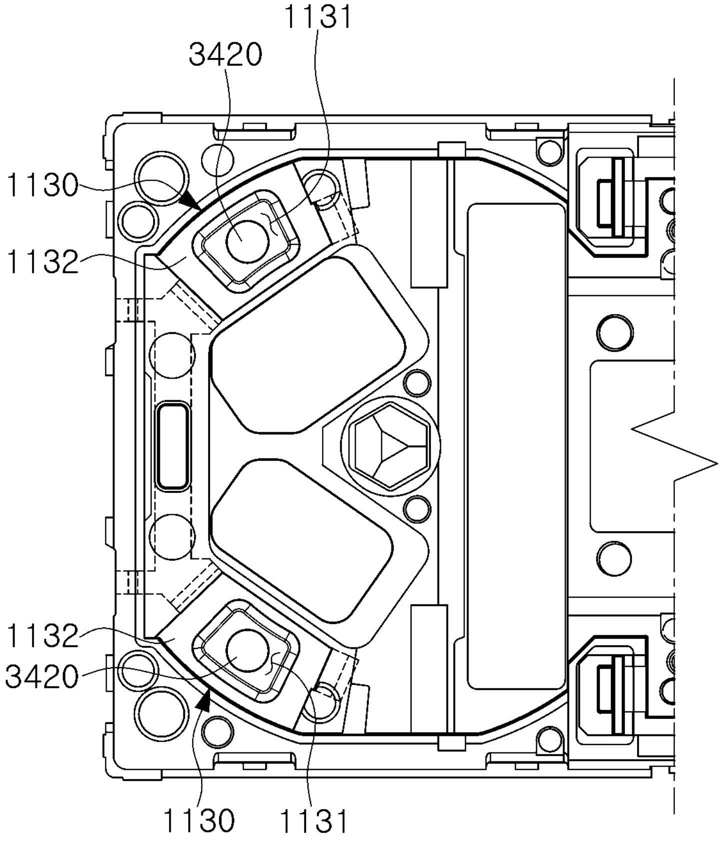
FIG. 8 is a view showing that the ball receiving portion and the guide ball member are disposed in the housing of the camera module according to the present disclosure.

The reflection module 3000 may further include a first yoke 3334 and a second yoke 3234, respectively, facing the driving magnets 3231 and 3331. For example, as shown in FIG. 8, the first yoke 3334 may be disposed on the back of the first driving coil 3332 facing the first driving magnet 3331. The second yoke 3234 may be disposed on the back of the second driving coil 3232 facing the second driving magnet 3231. The first yoke 3334 and the second yoke 3234 may serve to focus a magnetic flux of the driving magnet.

However, the driving unit 3230 or 3330 of the reflection module 3000 is not limited to the configuration described above, and may be anything as long as the driving unit may move the reflection holder 3200 or the rotation holder 3300.

The reflection module 3000 may include the rotation holder 3300 rotatable relative to the housing 1100. The rotation holder 3300 may be rotatable relative to the housing 1100 while supporting the reflection holder 3200 or the reflection member 3100 to be rotatable. For example, the rotation holder 3300 may be rotatable about the first rotation axis R1. Accordingly, the reflection member 3100 may also be rotated about the first rotation axis R1 together with the rotation holder 3300.

A plurality of ball members 3410 and 3420 may be disposed between the rotation holder 3300 and the housing 1100, supporting the rotation holder 3300 to be rotatable.

The plurality of the ball members 3410 and 3420 may include the first ball member 3410 forming the rotation axis (hereinafter, the first rotation axis R1) of the rotation holder 3300, and the guide ball member 3420 assisting a stable rotation of the rotation holder 3300.

The first ball member 3410 may form the first rotation axis R1 while being rotated in place while its position is fixed relative to the housing 1100. Accordingly, the first rotation axis R1 may pass through the first ball member 3410.

The first rotation axis R1 may approximately coincide with the first optical axis O1 of the first lens module 2000 facing the reflection module 3000. Accordingly, an imaginary line extending along the first optical axis O1 may pass through the first ball member 3410.

One or more guide ball members 3420 may be disposed. For example, as shown in FIGS. 5 and 6, the reflection module 3000 may include two guide ball members 3420 spaced apart from the first ball member 3410. The guide ball member 3420 may perform a rolling movement relative to the housing 1100 or the rotation holder 3300, and support the rotation holder 3300 for the rotation holder 3300 to be rotated while maintaining a predetermined distance from a bottom surface of the housing 1100.

Figure 7:
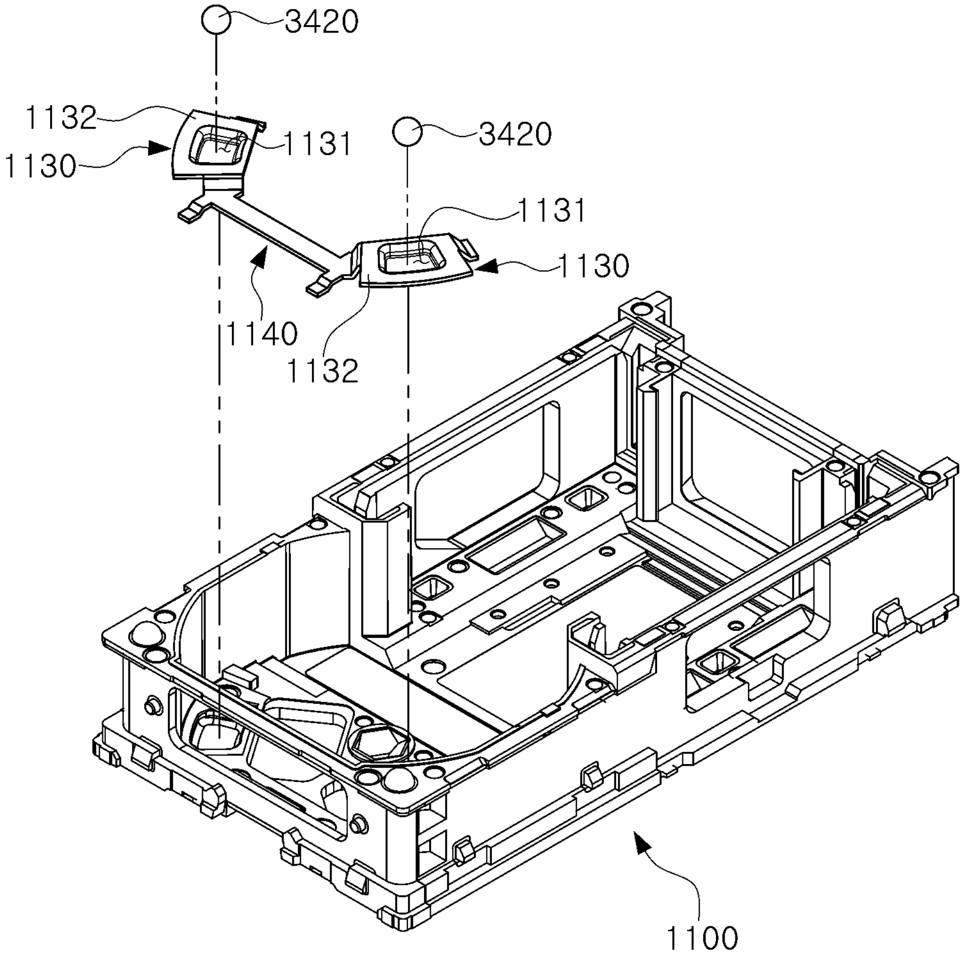
FIG. 7 is an exploded perspective view showing the housing, guide ball member, and ball receiving portion of the camera module according to the present disclosure.
Figure 9:
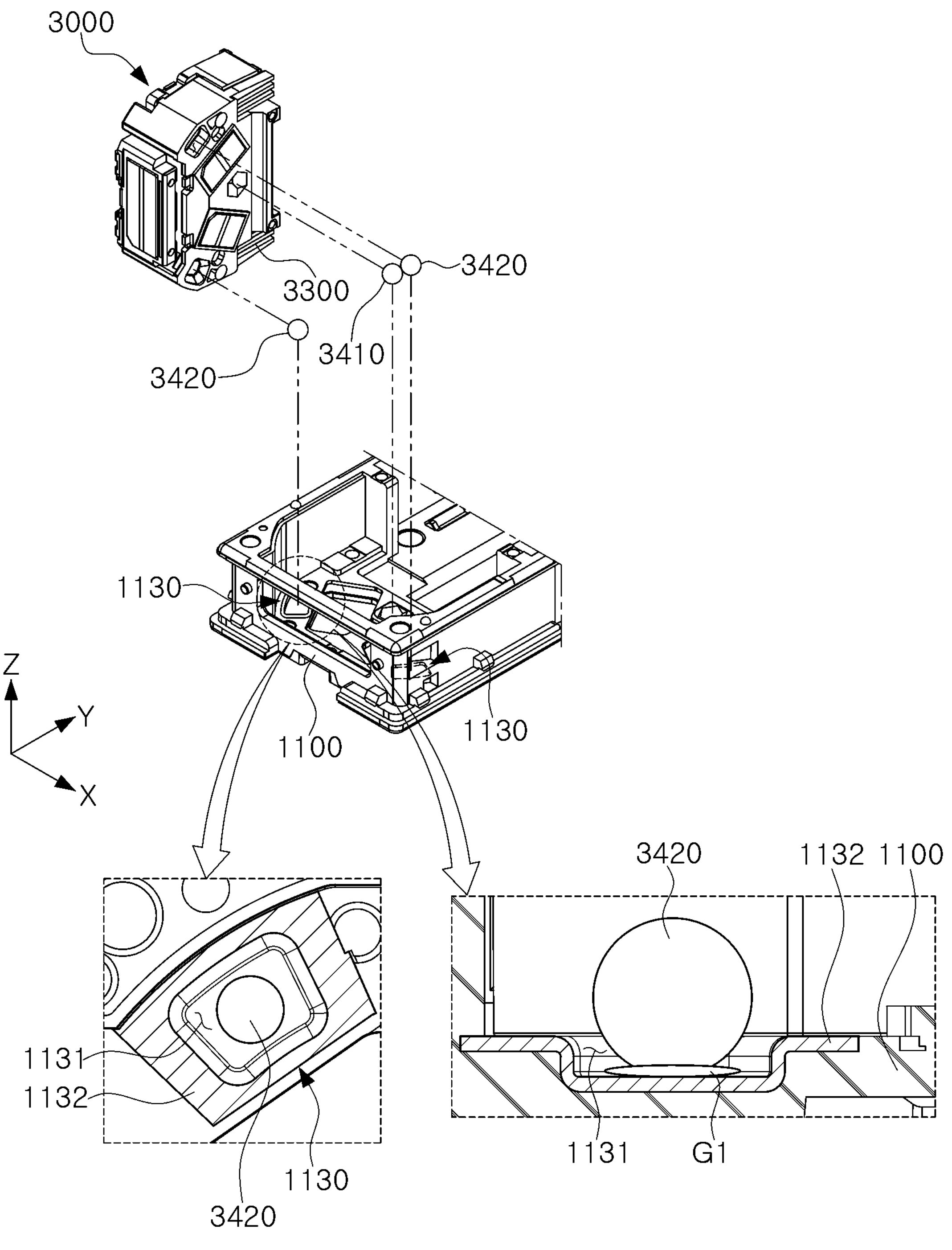
FIG. 9 is a view showing a structure where the guide ball member is disposed in the ball receiving portion according to an embodiment of the present disclosure.

FIG. 7 is an exploded perspective view showing the housing, guide ball member, and ball receiving portion of the camera module according to the present disclosure; FIG. 8 is a view showing that the ball receiving portion and the guide ball member are disposed in the housing of the camera module according to the present disclosure; and FIG. 9 is a view showing a structure where the guide ball member is disposed in the ball receiving portion according to an embodiment of the present disclosure. In FIG. 9, an enlarged view on the left shows the inside of the housing viewed from an object side, and an enlarged view on the right shows each cross section of the housing, the ball receiving portion, and the guide ball member in a width direction of a groove portion.

With reference to FIGS. 7 through 9, the description describes a ball receiving portion 1130 where the guide ball member 3420 of the camera module, according to an embodiment, is disposed.

The plurality of ball receiving portions 1130 may be provided. The plurality of ball receiving portions 1130 may be connected to each other through a connection part 1140. The plurality of ball receiving portions 1130 and the connection part 1140 may be integrated with each other. The ball receiving portion 1130 and the connection part 1140 may be made of the same material, and the material included in the ball receiving portion or the connection part may be a material having higher rigidity than a material included in the housing. For example, the ball receiving portion 1130 or the connection part 1140 may be made of metal. Alternatively, the ball receiving portion 1130 or the connection part 1140 may be made of stainless steel.

When the impact is applied to the camera module 100, this impact may be transmitted to the guide ball member 3420 and a contact surface in contact with the guide ball member 3420, thus deforming the shape of the contact surface. For example, the reflection module 3000 and the housing 1100 may face each other while having the guide ball member 3420 interposed therebetween. In this case, the impact may be concentrated on the narrow contact surface disposed between the guide ball member 3420 and the housing 1100, and the contact surface may thus be dented or deformed. This dent phenomenon may be prevented by having the ball receiving portion 1130 made of the metal or stainless steel.

The ball receiving portion 1130 may be coupled to the housing 1100. The connection part may also be coupled to the housing 1100. The connection part 1140 may be inserted into the housing 1100. A portion of the ball receiving portion 1130 may be inserted into the housing 1100. That is, the connection part 1140 may not be exposed externally from the housing 1100 when viewing the inside of the housing 1100 from the outside of the housing 1100. However, an upper surface of the ball receiving portion 1130 may be exposed externally from the housing 1100.

The ball receiving portion 1130 may include a groove portion 1131 and a flange portion 1132. The groove portion 1131 may include a groove structure having a suitable shape to guide the movement of the guide ball member 3420. The flange portion 1132 may indicate a region protruding externally from the groove portion 1131 along a perimeter of the groove portion 1131. The flange portion 1132 may have a flat structure disposed around the groove portion 1131. An inner bottom surface of the groove portion 1131 may have a step from an upper surface of the flange portion 1132. That is, the inner bottom surface of the groove portion 1131 may be spaced apart from the upper surface of the flange portion 1132 in the first direction.

As described above, the groove portion 1131 and the flange portion 1132 may be coupled to the housing 1100 to be visible from the outside. In detail, a lower side of the groove portion 1131 or the flange portion 1132 may be inserted into the housing 1100, and an upper side of the groove portion 1131 or the flange portion 1132 may be exposed externally from the housing 1100. That is, the inner bottom surface of the groove portion 1131 and the upper surface of the flange portion 1132 may be visible from the outside when viewing the inside of the housing 1100 from the object side.

The upper surface of the flange portion 1132 may be disposed on the same plane as a portion of an inner bottom surface of the housing 1100. That is, the upper surface of the flange portion 1132 and a portion of the inner bottom surface of the housing 1100 may have the same position in the first direction. The upper surface of the flange portion 1132 may directly face the reflection module 3000. The upper surface of the flange portion 1132 may overlap the reflection module 3000 in a first axis direction.

The inner bottom surface of the groove portion 1131 may be flat. When the ball receiving portion 1130 is coupled to the housing 1100, an inner bottom surface of the ball receiving portion 1130 may have a planar structure parallel to a length direction of the housing 1100. That is, the inner bottom surface of the ball receiving portion 1130 may be a plane parallel to the second direction.

The guide ball member 3420 may be disposed in the groove portion 1131. Grease G1 may be coated on the groove portion 1131. Grease G1 may be coated on the inner bottom surface of the groove portion 1131 to reduce friction occurring between the inner bottom surface of the groove portion 1131 and the guide ball member 3420.

As the guide ball member 3420 is moved in the groove portion 1131, grease G1 may flow in the groove portion 1131. The groove portion 1131 and the flange portion 1132 may be integrated with each other, and the flange portion 1132 may extend externally from the groove portion 1131 along the perimeter of the groove portion 1131, thereby preventing a portion of the grease G1 from flowing into a gap between the housing 1100 and the ball receiving portion. In addition, in a structure where grease G1 may flow into the gap formed between two members, a portion of components in grease G1 may flow into the gap to thus cause separation between the components in grease G1, which may thus harden grease G1. According to an embodiment of the present disclosure, the ball receiving portion 1130 includes the groove portion 1131 and the flange portion 1132 integrated with each other, thus having no gap into which grease G1 flows, thereby preventing grease G1 from hardening.

Figure 10:
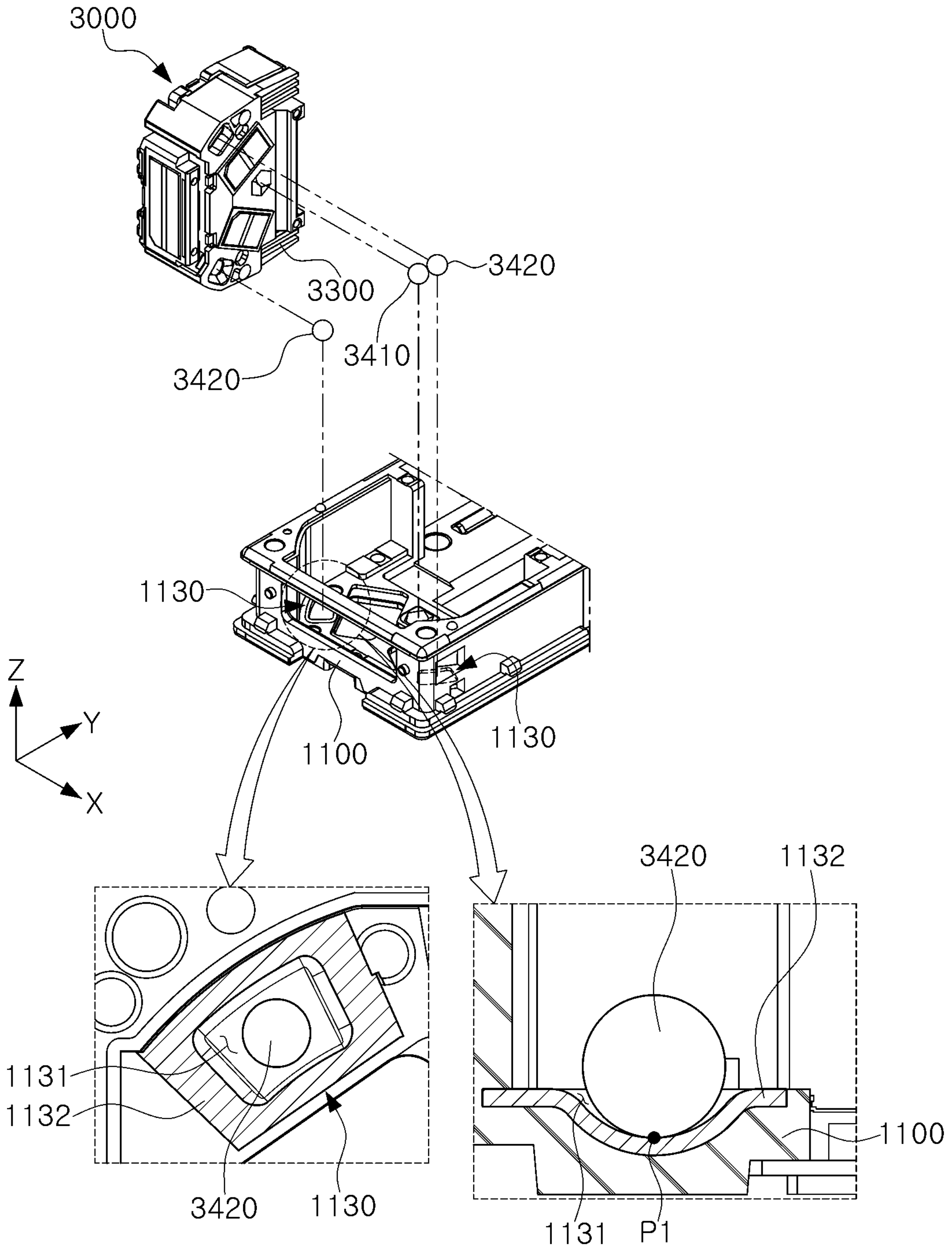
FIG. 10 is a view showing a structure where the guide ball member is disposed in the ball receiving portion of the camera module according to another embodiment of the present disclosure.

FIG. 10 is a view showing a structure where the guide ball member is disposed in the ball receiving portion of the camera module according to another embodiment of the present disclosure. In FIG. 10, an enlarged view on the left shows the inside of the housing viewed from the object side, and an enlarged view on the right shows each cross section of the housing, the ball receiving portion, and the guide ball member in the width direction of the groove portion. Referring to FIG. 10, the description describes the ball receiving portion 1130 according to another embodiment of the present disclosure. The description below omits the same description as that of an embodiment described above with reference to FIGS. 7 through 9.

The inner bottom surface of the groove portion 1131 may be curved. That is, the groove portion 1131 may be curved based on a cross section of the groove portion 1131 that is perpendicular to the length direction of the groove portion 1131. In other words, the cross section of the groove portion 1131 may be curved in the width direction.

The inner bottom surface of the groove portion 1131 and the guide ball member 3420 may be in one-point contact P1 with each other.

The inner bottom surface of the groove portion 1131 may have a radius of curvature greater than that of the guide ball member 3420. Through this structure, the groove portion 1131 and the guide ball member 3420 may be in one-point contact P1 with each other even when the guide ball member 3420 is moved in the groove portion 1131. That is, the guide ball member 3420 may be prevented from coming into contact with an uneven or protruding structure while the guide ball member 3420 is moved in the groove portion 1131 of the ball receiving portion 1130. Therefore, such a structure may prevent wear of the guide ball member 3420.

As set forth above, according to one or more embodiments of the present disclosure, the camera module may maintain performance thereof even when repeatedly used by preventing the dent from occurring between the ball member and the housing, which is caused by the movement of the reflection module.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:

a reflection module;

a housing configured to accommodate the reflection module to be rotatable;

a guide ball member disposed between the reflection module and the housing to guide the rotation of the reflection module; and a ball receiving portion, coupled to the housing, comprising a groove portion where the guide ball member is disposed and a flange portion extending externally from the groove portion, wherein the ball receiving portion is formed of a material having higher rigidity than a material of the housing, and wherein an upper surface of the flange portion and a portion of a bottom surface of the housing are disposed on a same plane with respect to an extension direction of the flange portion.

2. The camera module of claim 1, wherein the ball receiving portion is coupled to a bottom surface of the housing, and an upper surface of the flange portion is exposed externally from the bottom surface of the housing.

3. The camera module of claim 1, wherein an upper surface of the flange portion directly faces the reflection module in a rotation axis direction of the reflection module.

4. The camera module of claim 1, wherein the flange portion separates the groove portion from a portion of a bottom surface of the housing in a direction perpendicular to a rotation axis of the reflection module.

5. The camera module of claim 1, wherein a bottom surface of the groove portion is flat.

6. The camera module of claim 1, wherein the material of the ball receiving portion is metal.

7. The camera module of claim 1, further comprising grease coated on the groove portion.

8. The camera module of claim 1, wherein the ball receiving portion comprises a first ball receiving portion and a second ball receiving portion, and the first ball receiving portion and the second ball receiving portion are disposed on opposite sides of an intermediate position of the housing in a width direction.

9. The camera module of claim 8, further comprising a connection part connecting the first ball receiving portion to the second ball receiving portion.

10. The camera module of claim 1, further comprising a pulling yoke and a driving unit rotating the reflection module, wherein the driving unit comprises a driving magnet and a driving coil electromagnetically interacting with the driving magnet, and the pulling yoke faces the driving magnet.

11. The camera module of claim 1, further comprising a pulling yoke and a driving unit rotating the reflection module, wherein the driving unit comprises a driving magnet and a driving coil electromagnetically interacting with the driving magnet, and the pulling yoke faces the driving magnet.

12. The camera module of claim 1, further comprising a first ball member, wherein the first ball member is rotated in place and forms a rotation axis about which the reflection module is rotated, and the guide ball member is configured to roll in the groove portion by the rotation of the reflection module.

13. A camera module comprising:

a reflection module;

a housing configured to accommodate the reflection module to be rotatable;

a guide ball member disposed between the reflection module and the housing to guide the rotation of the reflection module; and a ball receiving portion, coupled to the housing, comprising a groove portion and a flange portion extending externally from the groove portion, the groove portion having a bottom surface that is curved based on a cross section of the groove portion in a width direction, and the cross section has a radius of curvature greater than a radius of curvature of the guide ball member, wherein a material of the ball receiving portion has a higher rigidity than a material of the housing, and the groove portion and the guide ball member are in one-point contact with each other.

14. The camera module of claim 13, wherein an upper surface of the flange portion is exposed externally when viewing an internal side of the housing from an object side.

15. The camera module of claim 13, wherein an upper surface of the flange portion and a portion of an inner bottom surface of the housing are disposed on a same plane.

16. The camera module of claim 13, wherein an upper surface of the flange portion directly faces the reflection module in a rotation axis direction in which the reflection module is rotated.

* * * * *